United States Patent
Marques et al.

(10) Patent No.: US 9,874,139 B2
(45) Date of Patent: Jan. 23, 2018

(54) ASSEMBLY WITH WASTEGATE OPENING, WASTEGATE SEAT AND WALL

(71) Applicant: Honeywell International Inc., Morristown, NJ (US)

(72) Inventors: Manuel Marques, Richardmenil (FR); Jean-Jacques Laissus, Thaon les Vosges (FR)

(73) Assignee: Honeywell International Inc., Morris Plains, NJ (US)

(*) Notice: Subject to any disclaimer, the term of this patent is extended or adjusted under 35 U.S.C. 154(b) by 943 days.

(21) Appl. No.: 13/716,678

(22) Filed: Dec. 17, 2012

(65) Prior Publication Data
US 2014/0165555 A1  Jun. 19, 2014

(51) Int. Cl.
F02B 37/18 (2006.01)

(52) U.S. Cl.
CPC ............ F02B 37/18 (2013.01); F02B 37/183 (2013.01); Y02T 10/144 (2013.01)

(58) Field of Classification Search
CPC ...... F02B 37/18; F02B 37/183; Y02T 10/144; F16K 1/54; F01D 17/105
USPC ..................... 60/602; 251/205, 301; 137/892
See application file for complete search history.

(56) References Cited

U.S. PATENT DOCUMENTS

| 4,270,356 A | 6/1981 | Will et al. | |
| 4,463,564 A * | 8/1984 | McInerney | F01D 17/105 137/892 |
| 8,109,257 B2 | 2/2012 | An et al. | |
| 2005/0178122 A1 | 8/2005 | Hastings et al. | |
| 2006/0213195 A1 * | 9/2006 | Leavesley | 60/605.1 |
| 2007/0204616 A1 * | 9/2007 | Martin | F02B 37/127 60/602 |
| 2010/0024414 A1 * | 2/2010 | Hittle | F02M 26/47 60/602 |
| 2010/0095672 A1 | 4/2010 | An et al. | |
| 2010/0187460 A1 * | 7/2010 | An et al. | 251/301 |
| 2011/0126537 A1 * | 6/2011 | Yoshimoto et al. | 60/614 |
| 2012/0055154 A1 | 3/2012 | Ebert | |
| 2012/0210709 A1 * | 8/2012 | Cizek | 60/602 |

(Continued)

FOREIGN PATENT DOCUMENTS

DE  4439432 C1  11/1995
EP  2199564 A1  6/2010

(Continued)

OTHER PUBLICATIONS

English Translation of DE 44 39 432 C1 (translated on Mar. 11, 2017 from Espacenet).*

(Continued)

Primary Examiner — Mark Laurenzi
Assistant Examiner — Paul Thiede
(74) Attorney, Agent, or Firm — Brian J. Pangrle

(57) ABSTRACT

An assembly can include a wastegate with a wastegate arm and a plug portion positionable in a closed operational state and in open operational states and a turbine housing component that includes a wall extending axially away from a wastegate seat to establish a relationship for exhaust flow from a wastegate opening to an exhaust chamber with respect to the open operational states of the wastegate. Various other examples of devices, assemblies, systems, methods, etc., are also disclosed.

15 Claims, 9 Drawing Sheets

(56) References Cited

U.S. PATENT DOCUMENTS

2012/0234002 A1* 9/2012 Lombard .............. F01D 17/105
                                                                60/602
2013/0149126 A1* 6/2013 Herrera Celaya et al. ... 415/200
2013/0189072 A1* 7/2013 Wade ................................ 415/1

FOREIGN PATENT DOCUMENTS

| EP | 2444625 A1 | 4/2012 |
| WO | 2010039596 A2 | 4/2010 |

OTHER PUBLICATIONS

European Search Report, Appl. No. 13193223.8, dated Apr. 15, 2014 (3 pages).

\* cited by examiner

ASSEMBLY WITH WASTEGATE OPENING, WASTEGATE SEAT AND WALL

TECHNICAL FIELD

Subject matter disclosed herein relates generally to wastegates for turbomachinery for internal combustion engines.

BACKGROUND

A turbocharger can include a wastegate that is controllable to reduce flow of exhaust from an internal combustion engine to a turbine wheel. Various technologies, techniques, etc., described herein relate to wastegates.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
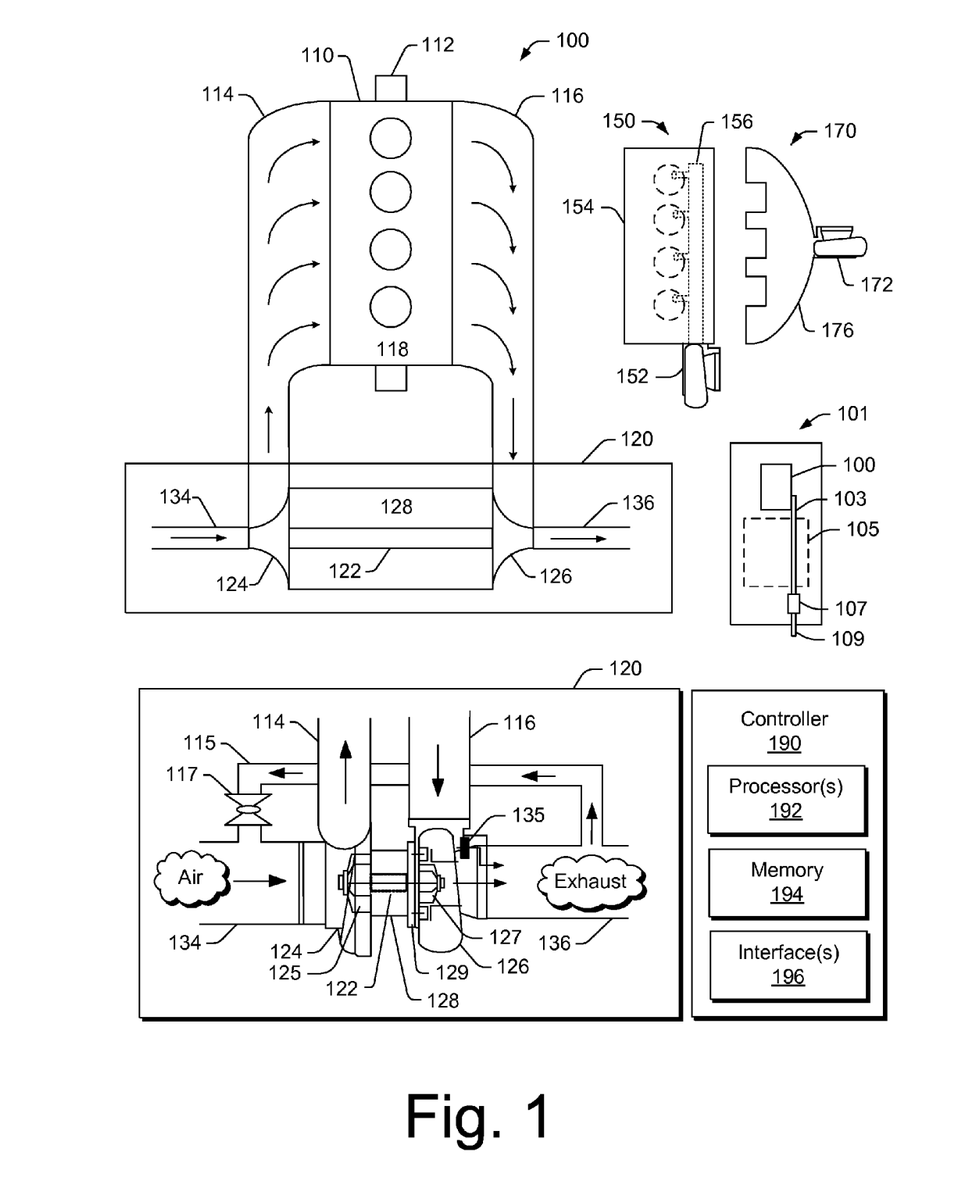
FIG. 1 is a diagram of examples of a turbocharger, an internal combustion engine, and various equipment.

Turbochargers are frequently utilized to increase output of an internal combustion engine. Referring to FIG. 1, an example of a turbocharged system 100 includes an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

In the example of FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136, which, for example, may be in fluid communication with the exhaust conduit 103 of the vehicle 101. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126 (e.g., upstream of the turbine wheel 127). The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1 an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, pressure, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, pressure, a variable geometry assembly (e.g., variable geometry compressor or turbine), a wastegate (e.g., via an actuator), an electric motor, or one or more other components associated with an engine, a turbocharger (or turbochargers), etc. As an example, the controller 190 may include instructions stored in the memory 194 executable by at least one of the one or more processors 192 for controlling a wastegate, for example, based on geometry of one or more wastegate components (e.g., wall geometry), which may characterize wastegate flow with respect to an operational state or states of the wastegate (e.g., as determined by angle of rotation of a wastegate arm, etc.).

Figure 2:
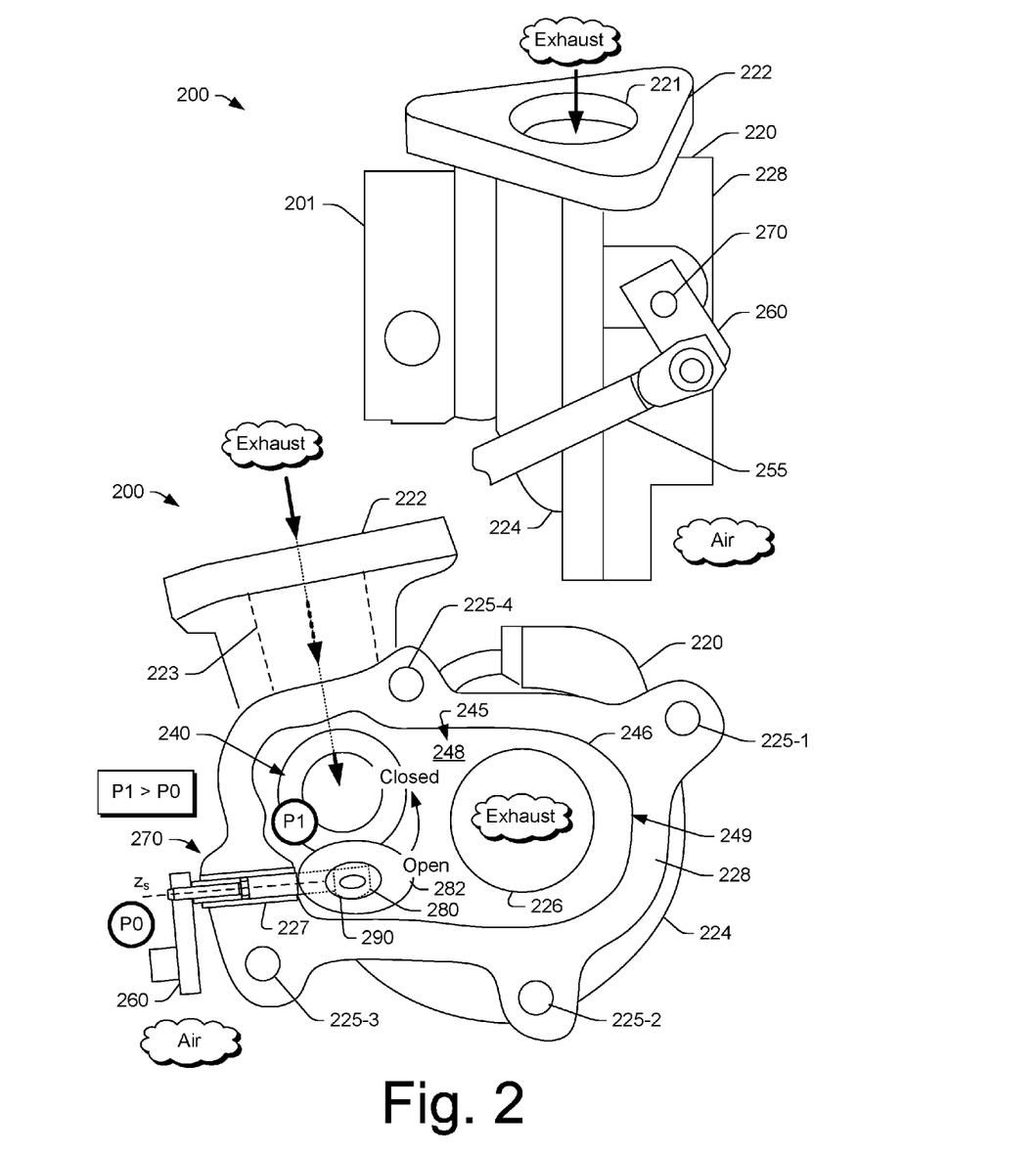
FIG. 2 is a series of views of an example of a turbine housing assembly that includes a wastegate.

FIG. 2 shows an example of an assembly 200 that includes a center housing 201 and a turbine housing assembly 220 with a wastegate 280. In the example of FIG. 2, the wastegate 280 is operably connected to a control shaft 270 positioned in a control shaft bore 227 of the turbine housing assembly 220. During operation of the turbocharger, the control shaft 270 is exposed to an exhaust environment that can have a pressure P1 and an ambient or air environment that can have a pressure P0 where P1 may be greater than P0. As shown, the control shaft 270 is positioned in the control shaft bore 227 and operably connected to a control arm 260 that is operably connected to a control rod 255. In the example of FIG. 2, actuation of the control rod 255 can cause the wastegate 280 to be positioned with respect to an opening 240 that provides an exhaust gas bypass for exhaust to bypass a turbine wheel space.

In the example of FIG. 2, the turbine housing assembly 220 includes an exhaust inlet flange 222 that includes an opening 221 (e.g., or openings) for a passage 223. The passage 223 is in fluid communication with a volute formed by a volute wall 224. In the example of FIG. 2, a nozzle (e.g., annular opening, etc.) may provide for flow of exhaust from the volute to a turbine wheel space where an opening 226 provides for flow of exhaust from the turbine wheel space to a chamber 245, for example, formed at least in part by a chamber wall 246 and a chamber floor 248.

As shown in the example of FIG. 2, the opening 240 exists in the chamber floor 248 and may be covered by the wastegate 280 (e.g., a plug portion 282 of the wastegate 280) responsive to rotation of the control shaft 270 in the control shaft bore 227. For example, the control shaft 270 may extend to a wastegate arm 290 (see dashed line) that connects the control shaft 270 to the plug portion 282 of the wastegate 280. In such an example, rotation of the control shaft 270 about a control shaft axis $z_s$ can act to position the plug portion 282 of the wastegate 280 in an open position or a closed position with respect to the opening 240. In the open position, the passage 223 is in fluid communication with the chamber 245 via the opening 240 in the chamber floor 248. In the open position, exhaust received via the opening 221 of the exhaust inlet flange 222 may bypass the volute formed by the volute wall 224.

In the example of FIG. 2, the chamber wall 246 extends to a flange portion 228 to define an exhaust outlet opening 249. Exhaust received by the chamber 245, whether via the opening 240 or the opening 226 may exit the turbine housing assembly 220 via the exhaust outlet opening 249. As an example, a conduit may be attached to the flange portion 228 via attachment mechanisms, for example, that may cooperate with openings 225-1, 225-2, 225-3, and 225-4. Exhaust received by such a conduit (e.g., from the exhaust outlet opening 249) may flow to equipment such as a catalytic converter, a muffler (e.g., sound absorber), etc., and eventually to an ambient or air environment (see, e.g., the vehicle 101 of FIG. 1), which may be, for example, at the pressure P0.

Figure 3:
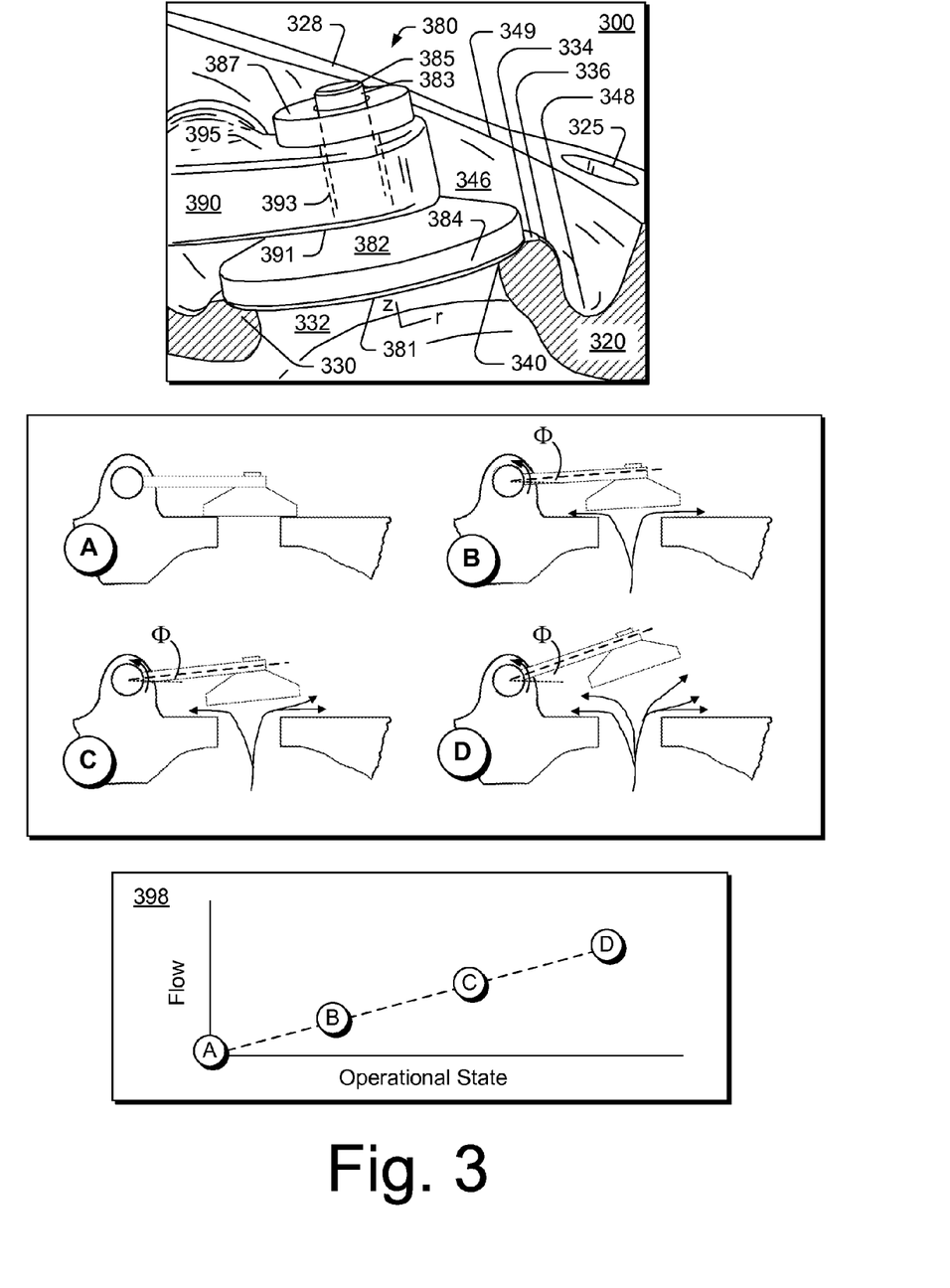
FIG. 3 is a cutaway view of an example of an assembly that includes a wastegate and various diagrams illustrating operation of a wastegate.

FIG. 3 shows a cutaway view of an example of an assembly 300 that includes a turbine housing component 320 and a wastegate 380, various examples of operational states (A, B, C, and D) and an example of a plot 398 of flow versus operational state. In the assembly 300, the turbine housing component 320 includes an opening 340, for example, as defined by a surface 332 of a substantially cylindrical wall portion 330 of the turbine housing component 320. As shown, the wall 332 extends to an edge (e.g., defining the opening 340) and then flattens joining a relatively flat surface 334, which may be referred to as a wastegate seat. In the example of FIG. 3, the surface 332 defines a relatively short passage, for example, having an axis (e.g., a z-axis), from which the surface 332 is disposed at a radial distance (e.g., an r-axis).

Extending away from the opening 340, the seat 334 descends along another surface 336 (e.g., of the substantially cylindrical wall portion 330) to a floor 348 of an exhaust chamber formed in part by the turbine housing component 320, for example, in combination with a wall surface 346.

As shown in FIG. 3, the wall surface 346 of the turbine housing component 320 rises to an edge that defines an opening 349 of the exhaust chamber and then extends outwardly to a relatively flat surface 328, which may include one or more apertures, etc., such as an aperture 325, for example, to attachment of another component to the turbine housing component 320.

In the example of FIG. 3, the wastegate 380 includes a plug portion 382 that is connected to a wastegate arm 390. The plug portion 382 includes a lower surface 381, a stem 383 that extends upwardly to an upper end 385 of the plug portion 382 and a rim surface 384 (e.g., disposed at a radius about the stem 383 and having an axial height). As shown, the stem 383 is received by a bore 393 of the wastegate arm 390 where the bore 393 extends between a lower surface 391 and an upper surface 395 of the wastegate arm 390. In the example of FIG. 3, a clamping washer 387 clamps to the stem 383 of the plug portion 382 to thereby prevent the stem 383 from sliding through the bore 393 of the wastegate arm 390. Accordingly, as the wastegate arm 390 pivots, the lower surface 381 of the plug portion 382 is positioned with respect to the seat 334 of the turbine housing component 320 for opening and closing of the wastegate 380.

Four examples of operational states A, B, C and D are shown in FIG. 3 for varying pivot angles Φ of a wastegate arm such as the wastegate arm 390. Small arrows indicate amount and direction of flow of exhaust through an opening such as the opening 340 in response to a plug portion of a wastegate being positioned with respect to a seat about the opening. As shown in the plot 398, as the pivot angle Φ increases, the amount of flow increases, for example, in a relatively linear manner (e.g., flow as a linear function of pivot angle).

As described herein, various technologies, techniques, etc., may provide for particular flow characteristics, for example, to achieve a more progressive curve of turbocharger boost to wastegate position (e.g., openness) than possible with the assembly 300 of FIG. 3. For example, an assembly may include a wall that rises above a wastegate seat. As an example, geometry of such a wall may provide for flow characteristics, which may be evidenced via a plot of flow versus pivot angle. In such an example, a controller may be programmed or otherwise configured based on flow characteristics (e.g., via tests, a priori knowledge, etc.) to enhance turbocharger performance (e.g., boost, emissions, surge, etc.). For example, a controller such as the controller 190 of FIG. 1 may be programmed with a function for exhaust flow versus pivot angle of a wastegate arm where the function depends on one or more characteristics of a wall, features of a wall, etc., with respect to a wastegate seat.

Figure 4:
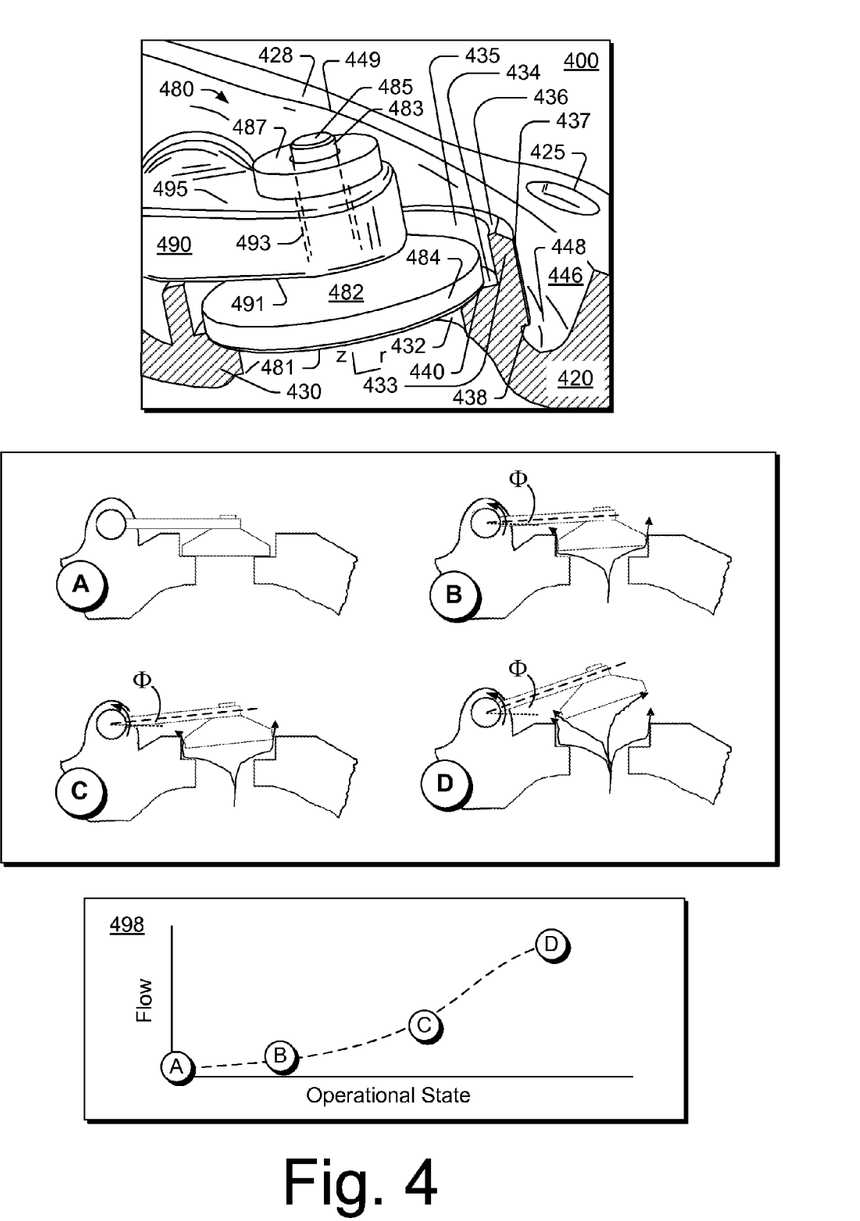
FIG. 4 is a cutaway view of an example of an assembly that includes a wastegate and a wall and various diagrams illustrating operation of a wastegate.

FIG. 4 shows a cutaway view of an example of an assembly 400 that includes a turbine housing component 420 and a wastegate 480, various examples of operational states (A, B, C, and D) and an example of a plot 498 of flow versus operational state. In the assembly 400, the turbine housing component 420 includes an opening 440, for example, as defined by a surface 432 of a substantially cylindrical wall portion 430 of the turbine housing component 420. As shown, the surface 432 extends to an edge (e.g., defining the opening 440) and then flattens joining a relatively flat surface 434, which may be referred to as a wastegate seat (e.g., which may be defined by a radius about a z-axis). In the example of FIG. 4, the surface 432 defines a relatively short passage, for example, having an axis (e.g., a z-axis), from which the surface 432 is disposed at a radial distance (e.g., an r-axis).

In the example of FIG. 4, extending away from the opening 440, the seat 434 meets a wall 433 (e.g., at a corner) where the wall 433 has a surface 435 that rises to an edge. From the edge, the wall 433 extends outwardly along a surface 436, which may then descend downwardly (e.g., at an angle) to another surface 437 that extends further downwardly to a lower edge 438 (e.g., a corner), which may be at a position radially outward from the surface 432 of the substantially cylindrical wall portion 430 of the turbine housing component 420. As shown in the example of FIG. 4, the substantially cylindrical wall portion 430 descends to a floor 448 of an exhaust chamber formed in part by the turbine housing component 420, for example, in combination with a wall surface 446.

As shown in FIG. 4, the wall surface 446 of the turbine housing component 420 rises to an edge that defines an opening 449 of the exhaust chamber and then extends outwardly to a relatively flat surface 428, which may include one or more apertures, etc., such as an aperture 425, for example, to attachment of another component to the turbine housing component 420.

In the example of FIG. 4, the surface 436 of the wall 430 may include a height that is substantially level with the relatively flat surface 428; for example, without the wastegate 480 installed in the assembly 400, the turbine housing component 420 may be positioned on a flat surface such that the surface 428 is in contact with that flat surface (i.e., the surface 436 of the wall 430 does not interfere with laying the turbine housing component 420 on a flat surface, e.g., for purposes of machining, polishing, assembling, etc.).

In the example of FIG. 4, the wastegate 480 includes a plug portion 482 that is connected to a wastegate arm 490. The plug portion 482 includes a lower surface 481, a stem 483 that extends upwardly to an upper end 485 of the plug portion 482 and a rim surface 484 (e.g., disposed at a radius about the stem 483 and having an axial height). As shown, the stem 483 is received by a bore 493 of the wastegate arm 490 where the bore 493 extends between a lower surface 491 and an upper surface 495 of the wastegate arm 490. In the example of FIG. 4, a clamping washer 487 clamps to the stem 483 of the plug portion 482 to thereby prevent the stem 483 from sliding through the bore 493 of the wastegate arm 490. Accordingly, as the wastegate arm 490 pivots, the lower surface 481 of the plug portion 482 is positioned with respect to the seat 434 of the turbine housing component 420 for opening and closing of the wastegate 480.

Four examples of operational states A, B, C and D are shown in FIG. 4 for varying pivot angles $\Phi$ of a wastegate arm such as the wastegate arm 490. Small arrows indicate amount and direction of flow of exhaust through an opening such as the opening 440 in response to a plug portion of a wastegate being positioned with respect to a seat about the opening. In the example of FIG. 4, the opening is surrounded by a wall such as the wall 430. As shown in the plot 498, as the pivot angle $\Phi$ increases, the amount of flow increases, for example, in a relatively nonlinear manner (e.g., flow as a nonlinear function of pivot angle).

As described herein, various technologies, techniques, etc., may provide for particular flow characteristics, for example, to achieve a more progressive curve of turbocharger boost to wastegate position (e.g., openness). As shown in the example of FIG. 4, the assembly 400 includes a wall 433 that rises above the wastegate seat 434. As an example, geometry of the wall 433 may provide for flow characteristics, which may be evidenced via a plot of flow versus pivot angle of the wastegate arm 490 (see, e.g., the plot 498).

As an example, a controller may be programmed or otherwise configured based on flow characteristics (e.g., via tests, a priori knowledge, etc.) to enhance turbocharger performance (e.g., boost, emissions, surge, etc.). For example, a controller such as the controller 190 of FIG. 1 may be programmed or otherwise configured to operate at least in part with respect to a function for exhaust flow versus pivot angle of a wastegate arm where the function depends on one or more characteristics of a wall, features of a wall, etc., with respect to a wastegate seat.

Figure 5:
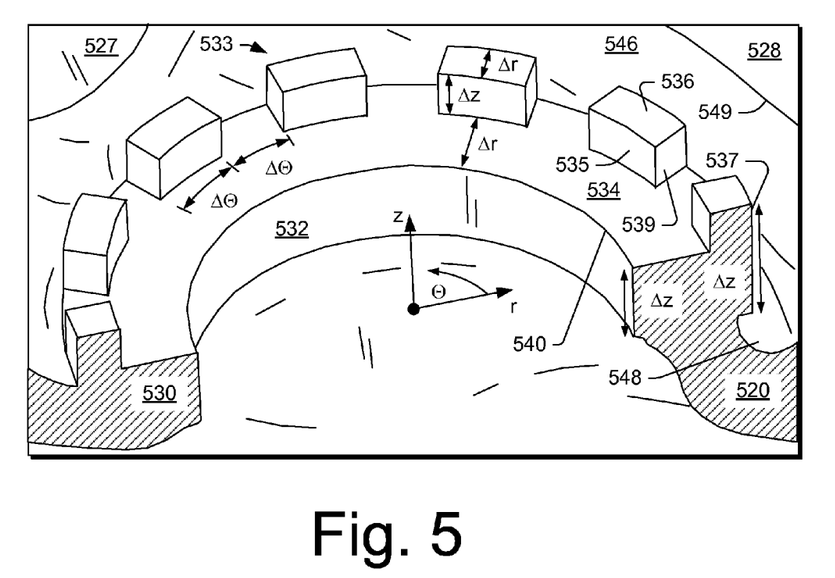
FIG. 5 is a cutaway view of an example of a wall associated with a wastegate opening.

FIG. 5 shows a cutaway view of an example of a turbine housing component 520 that includes a substantially cylindrical wall portion 530 that defines an opening 540 and a segmented wall 533 extending from the substantially cylindrical wall portion 530. As shown, various features of the turbine housing component 520 may be described with respect to a cylindrical coordinate system (r, z, $\Theta$).

In the example of FIG. 5, the turbine housing component 520 includes a bore 527, which may receive a shaft associated with a wastegate arm, for example, to pivot the wastegate arm and thereby position a plug portion of a wastegate with respect to the segmented wall 533 and the opening 540. In the example of FIG. 5, the turbine housing component 520 also includes a substantially flat surface 528 that extends to an edge to define an opening 549 to a chamber, for example, defined at least in part by a wall surface 546 and a floor surface 548 where the wall surface 546 extends to the floor surface 548 (see, e.g., the assembly 200 of FIG. 2, the assembly 400 of FIG. 4, etc.).

As mentioned, the turbine housing component 520 includes a substantially cylindrical wall portion 530. As shown, a surface 532 of the substantially cylindrical wall portion 530 is positioned at a radius and extends axially to an edge to define the opening 540 (e.g., to define a relatively short passage). A substantially flat surface 534 extends from the edge radially outwardly about the opening 540 and forms, in part, a wastegate seat. In the example of FIG. 5, segments of the segmented wall 533 rise axially from the substantially flat surface 534 at a radial position that is greater than that forming the wastegate seat (see, e.g., a dimension Δr extending between the opening 540 and one of the segments).

In the example of FIG. 5, each of the segments of the segmented wall 533 includes a surface 535 that rises an axial distance Δz above the surface 534 and that spans an angle ΔΘ. Each of the segments of the segmented wall 533 also includes an upper surface 536 that extends radially outwardly from an edge with the surface 535 (see, e.g., a dimension Δr). Each of the segments of the segmented wall 533 also include a back surface 537 that descends axially downwardly, for example, which may meet a back surface of the substantially cylindrical wall portion 530 of the turbine housing component 520. Yet further, each of the segments of the segmented wall 533 includes side surfaces, for example, such as a side surface 539. As shown, a side surface of one segment and a side surface of an adjacent segment form an inter-segment passage, which may be defined by an angle (see, e.g., angle ΔΘ).

While the example of FIG. 5 shows a particular number of segments of the segmented wall 533 in a particular arrangement, the number of segments, spacing, shape, etc., may differ, for example, to achieve one or more performance goals for a turbocharger. For example, positioning of a plug portion of a wastegate with respect to the segmented wall 533 and the opening 540 may be controlled by a controller (e.g., via pivoting of a wastegate arm) to achieve one or more performance goals for a turbocharger where the segmented wall 533 provides for a particular flow versus operational state profile (e.g., pivot angle of a wastegate arm, etc.).

Figure 6:
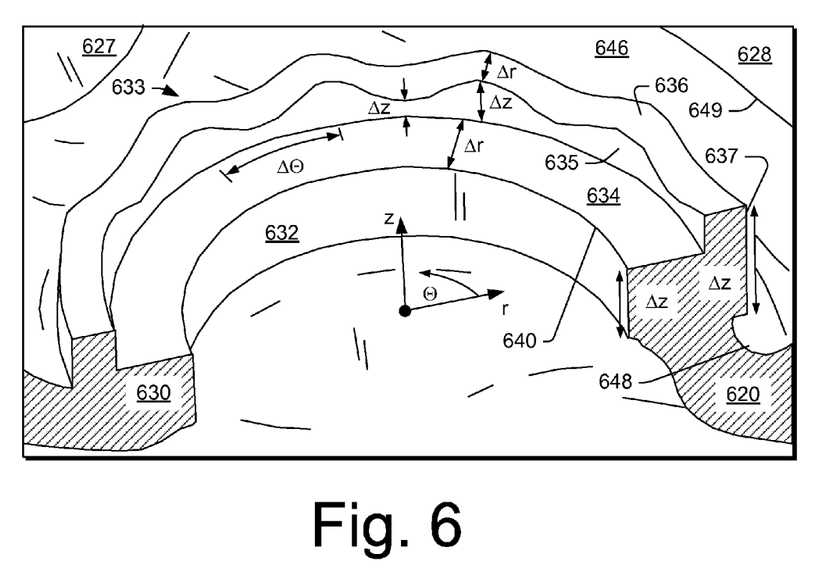
FIG. 6 is a cutaway view of an example of a wall associated with a wastegate opening.

FIG. 6 shows a cutaway view of an example of a turbine housing component 620 that includes a substantially cylindrical wall portion 630 that defines an opening 640 and a wavy or sinusoidal wall 633 extending from the substantially cylindrical wall portion 630. As shown, various features of the turbine housing component 620 may be described with respect to a cylindrical coordinate system (r, z, Θ).

In the example of FIG. 6, the turbine housing component 620 includes a bore 627, which may receive a shaft associated with a wastegate arm, for example, to pivot the wastegate arm and thereby position a plug portion of a wastegate with respect to the wavy wall 633 and the opening 640. In the example of FIG. 6, the turbine housing component 620 also includes a substantially flat surface 628 that extends to an edge to define an opening 649 to a chamber, for example, defined at least in part by a wall surface 646 and a floor surface 648 where the wall surface 646 extends to the floor surface 648 (see, e.g., the assembly 200 of FIG. 2, the assembly 400 of FIG. 4, etc.).

As mentioned, the turbine housing component 620 includes a substantially cylindrical wall portion 630. As shown, a surface 632 of the substantially cylindrical wall portion 630 is positioned at a radius and extends axially to an edge to define the opening 640 (e.g., and to define a relatively short passage). A substantially flat surface 634 extends from the edge radially outwardly about the opening 640 and forms, in part, a wastegate seat. In the example of FIG. 6, the wavy wall 633 rises axially from the substantially flat surface 634 at a radial position that is greater than that forming the wastegate seat (see, e.g., a dimension Δr extending between the opening 640 and the wavy wall 633).

In the example of FIG. 6, the wavy wall 533 includes a surface 635 that rises an axial distance Δz above the surface 634 where the axial distance Δz varies with respect to azimuthal position (e.g., angle Θ about the z-axis). As an example, the wavy wall 633 may be characterized by a wave having an angular span ΔΘ. As shown, the wavy wall 633 also includes an upper surface 636 that extends radially outwardly from an edge with the surface 635 (see, e.g., a dimension Δr). The wavy wall 633 also include a back surface 637 that descends axially downwardly, for example, which may meet a back surface of the substantially cylindrical wall portion 630 of the turbine housing component 620.

While the example of FIG. 6 shows a particular wave shape of the wavy wall 633 in a particular arrangement, the number of waves, spacing, shape, etc., may differ, for example, to achieve one or more performance goals for a turbocharger. For example, positioning of a plug portion of a wastegate with respect to the wavy wall 633 and the opening 640 may be controlled by a controller (e.g., via pivoting of a wastegate arm) to achieve one or more performance goals for a turbocharger where the wavy wall 633 provides for a particular flow versus operational state profile (e.g., pivot angle of a wastegate arm, etc.).

Figure 7:
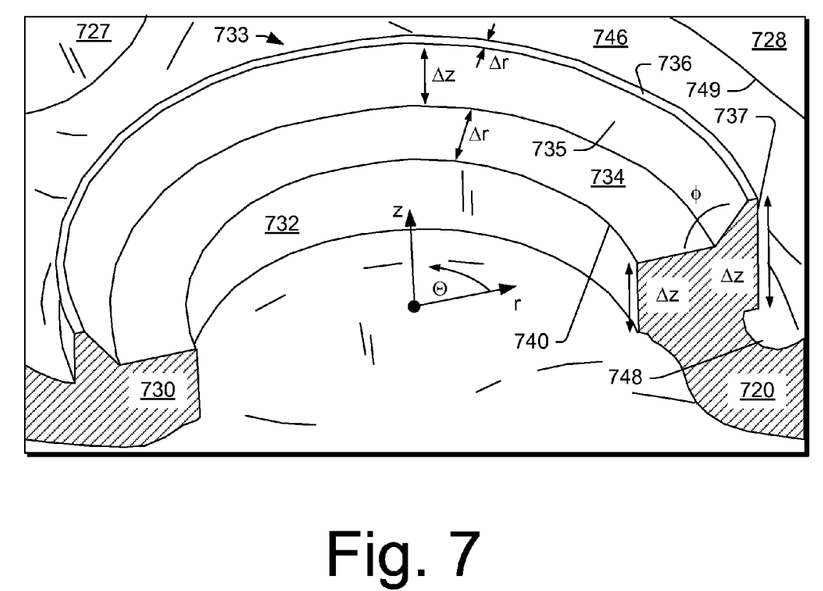
FIG. 7 is a cutaway view of an example of a wall associated with a wastegate opening.

FIG. 7 shows a cutaway view of an example of a turbine housing component 720 that includes a substantially cylindrical wall portion 730 that defines an opening 740 and a wall 733 extending from the substantially cylindrical wall portion 730. As shown, various features of the turbine housing component 720 may be described with respect to a cylindrical coordinate system (r, z, Θ).

In the example of FIG. 7, the turbine housing component 720 includes a bore 727, which may receive a shaft associated with a wastegate arm, for example, to pivot the wastegate arm and thereby position a plug portion of a wastegate with respect to the wall 733 and the opening 740. In the example of FIG. 7, the turbine housing component 720 also includes a substantially flat surface 728 that extends to an edge to define an opening 749 to a chamber, for example, defined at least in part by a wall surface 746 and a floor surface 748 where the wall surface 746 extends to the floor surface 748 (see, e.g., the assembly 200 of FIG. 2, the assembly 400 of FIG. 4, etc.).

As mentioned, the turbine housing component 720 includes a substantially cylindrical wall portion 730. As shown, a surface 732 of the substantially cylindrical wall portion 730 is positioned at a radius and extends axially to an edge to define the opening 740 (e.g., and to define a relatively short passage). A substantially flat surface 734 extends from the edge radially outwardly about the opening 740 and forms, in part, a wastegate seat. In the example of FIG. 7, the wall 733 rises axially at an angle φ from the substantially flat surface 734 at a radial position that is greater than that forming the wastegate seat (see, e.g., a dimension Δr extending between the opening 740 and the wall 733).

In the example of FIG. 7, the wall 733 includes a surface 735 that rises at the angle φ an axial distance Δz above the surface 734. As shown, the wall 733 also includes an upper surface 736 that extends radially outwardly from an edge with the surface 735 (see, e.g., a dimension Δr). The wall 733 also include a back surface 737 that descends axially downwardly, for example, which may meet a back surface of the substantially cylindrical wall portion 730 of the turbine housing component 720.

While the example of FIG. 7 shows a particular shape of the wall 733 in a particular arrangement, the angle (or angles), spacing, shape, etc., may differ, for example, to achieve one or more performance goals for a turbocharger. For example, positioning of a plug portion of a wastegate with respect to the wall 733 and the opening 740 may be controlled by a controller (e.g., via pivoting of a wastegate arm) to achieve one or more performance goals for a turbocharger where the wall 733 provides for a particular flow versus operational state profile (e.g., pivot angle of a wastegate arm, etc.).

Figure 8:
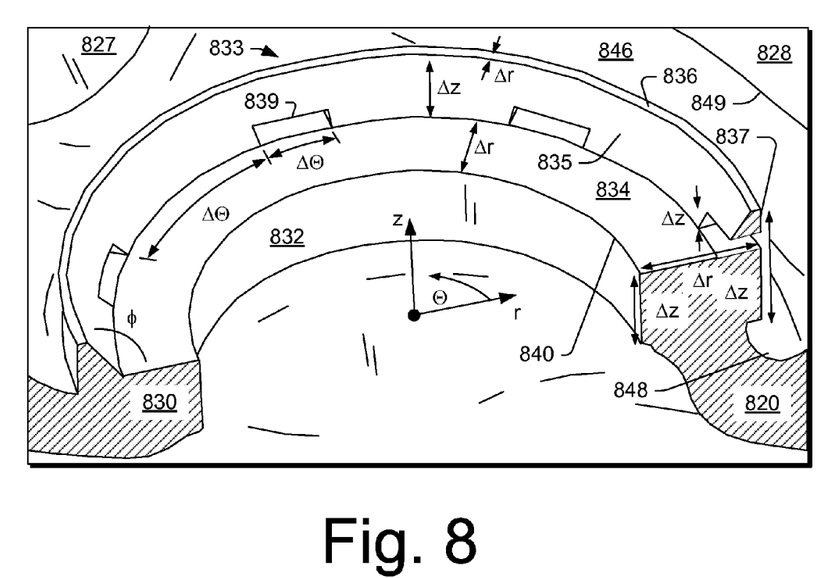
FIG. 8 is a cutaway view of an example of a wall associated with a wastegate opening.

FIG. 8 shows a cutaway view of an example of a turbine housing component 820 that includes a substantially cylindrical wall portion 830 that defines an opening 840 and a wall 833 extending from the substantially cylindrical wall portion 830 where the wall 833 includes flow passages 839. As shown, various features of the turbine housing component 820 may be described with respect to a cylindrical coordinate system (r, z, Θ).

In the example of FIG. 8, the turbine housing component 820 includes a bore 827, which may receive a shaft associated with a wastegate arm, for example, to pivot the wastegate arm and thereby position a plug portion of a wastegate with respect to the wall 833 and the opening 840. In the example of FIG. 8, the turbine housing component 820 also includes a substantially flat surface 828 that extends to an edge to define an opening 849 to a chamber, for example, defined at least in part by a wall surface 846 and a floor surface 848 where the wall surface 646 extends to the floor surface 848 (see, e.g., the assembly 200 of FIG. 2, the assembly 400 of FIG. 4, etc.).

As mentioned, the turbine housing component 820 includes a substantially cylindrical wall portion 830. As shown, a surface 832 of the substantially cylindrical wall portion 830 is positioned at a radius and extends axially to an edge to define the opening 840 (e.g., and to define a relatively short passage). A substantially flat surface 834 extends from the edge radially outwardly about the opening 840 and forms, in part, a wastegate seat. In the example of FIG. 8, the wall 633 rises axially at an angle φ from the substantially flat surface 834 and at a radial position that is greater than that forming the wastegate seat (see, e.g., a dimension Δr extending between the opening 840 and the wall 833).

In the example of FIG. 8, the wall 833 includes a surface 835 that rises at the angle φ to an axial distance Δz above the surface 834 where each of the flow passages 839 may be defined by an axial distance Δz and an angular span ΔΘ. As shown, the wall 833 also includes an upper surface 836 that extends radially outwardly from an edge with the surface 835 (see, e.g., a dimension Δr). The wall 833 also include a back surface 837 that descends axially downwardly, for example, which may meet a back surface of the substantially cylindrical wall portion 830 of the turbine housing component 820. As shown in the cutaway view of FIG. 8, each of the flow passages 839 extends to the back surface 837, for example, for flow of exhaust from one side of the wall 833 (e.g., an opening side or wastegate plug portion side) to the other (e.g., a chamber side).

While the example of FIG. 8 shows a particular shape of the wall 833 in a particular arrangement, the number of flow passages, spacing, shape, etc., may differ, for example, to achieve one or more performance goals for a turbocharger. For example, positioning of a plug portion of a wastegate with respect to the wall 833 and the opening 840 may be controlled by a controller (e.g., via pivoting of a wastegate arm) to achieve one or more performance goals for a turbocharger where the wall 833 provides for a particular flow versus operational state profile (e.g., pivot angle of a wastegate arm, etc.).

Figure 9:
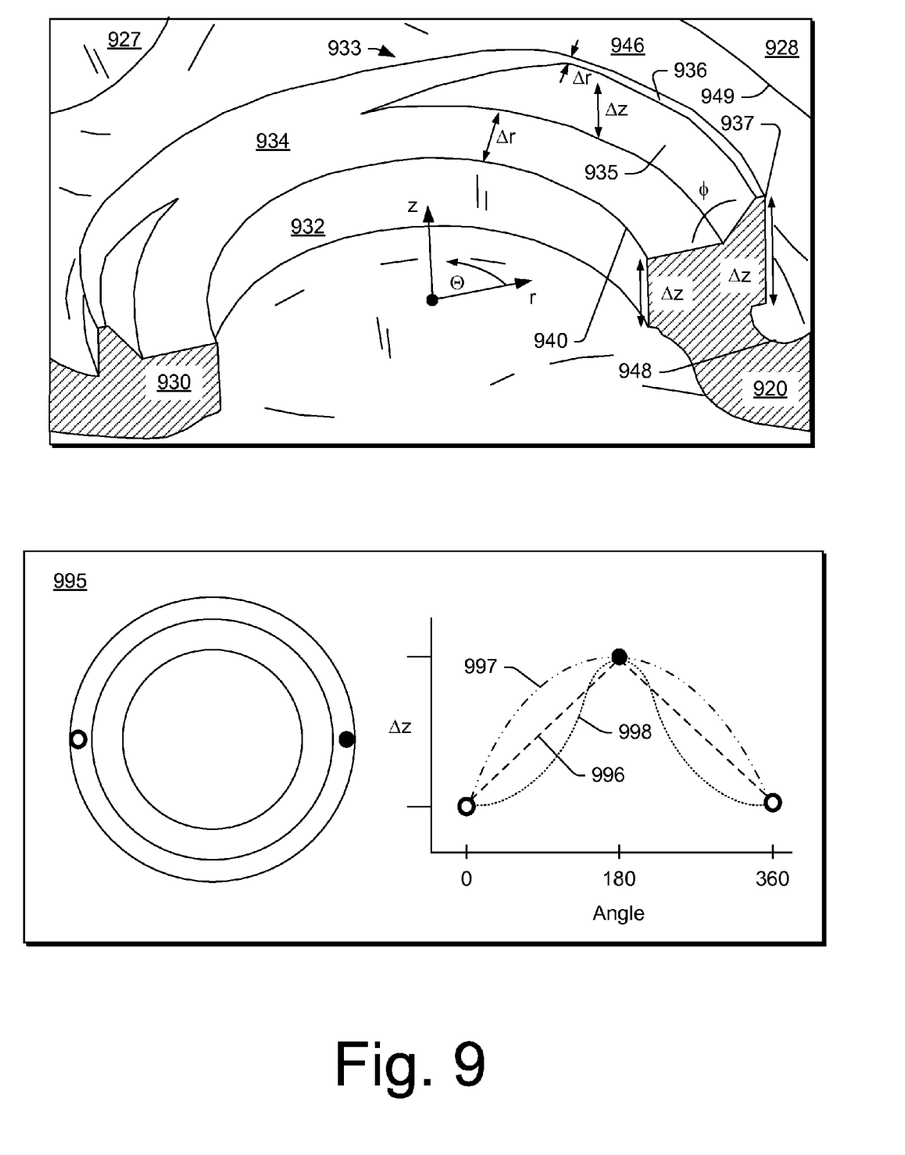
FIG. 9 is a cutaway view of an example of a wall associated with a wastegate opening along with a plot.

FIG. 9 shows a cutaway view of an example of a turbine housing component 920 that includes a substantially cylindrical wall portion 930 that defines an opening 940 and a wall 933 extending from the substantially cylindrical wall portion 930. As shown, various features of the turbine housing component 920 may be described with respect to a cylindrical coordinate system (r, z, Θ).

In the example of FIG. 9, the turbine housing component 920 includes a bore 927, which may receive a shaft associated with a wastegate arm, for example, to pivot the wastegate arm and thereby position a plug portion of a wastegate with respect to the wall 933 and the opening 940. In the example of FIG. 9, the turbine housing component 920 also includes a substantially flat surface 928 that extends to an edge to define an opening 949 to a chamber, for example, defined at least in part by a wall surface 946 and a floor surface 948 where the wall surface 946 extends to the floor surface 948 (see, e.g., the assembly 200 of FIG. 2, the assembly 400 of FIG. 4, etc.).

As mentioned, the turbine housing component 920 includes a substantially cylindrical wall portion 930. As shown, a surface 932 of the substantially cylindrical wall portion 930 is positioned at a radius and extends axially to an edge to define the opening 940 (e.g., and to define a relatively short passage). A substantially flat surface 934 extends from the edge radially outwardly about the opening 940 and forms, in part, a wastegate seat. In the example of FIG. 9, the wall 933 rises axially at an angle φ from the substantially flat surface 934 at a radial position that is greater than that forming the wastegate seat (see, e.g., a dimension Δr extending between the opening 940 and the wall 933).

In the example of FIG. 9, the wall 933 includes a surface 935 that rises at the angle φ an axial distance Δz above the surface 934. As shown, the wall 933 also includes an upper surface 936 that extends radially outwardly from an edge with the surface 935 (see, e.g., a dimension Δr). The wall 933 also include a back surface 937 that descends axially downwardly, for example, which may meet a back surface of the substantially cylindrical wall portion 930 of the turbine housing component 920. Further, in the example of FIG. 9, the wall 933 does not fully surround the opening 940. Such a wall may be considered a segmented wall, for example, as including a single segment that does not span 360 degrees about an axis (e.g., the z-axis of the cylindrical coordinate system). As an example, the wall 933 may be configured to provide clearance for a wastegate arm of a wastegate assembly where the wastegate arm carries a plug portion configured to seat against the wastegate seat of the surface 932 to close the opening 940.

While the example of FIG. 9 shows a particular shape of the wall 933 in a particular arrangement, the angle (or angles), spacing, shape, etc., may differ, for example, to achieve one or more performance goals for a turbocharger. For example, positioning of a plug portion of a wastegate with respect to the wall 933 and the opening 940 may be controlled by a controller (e.g., via pivoting of a wastegate arm) to achieve one or more performance goals for a turbocharger where the wall 933 provides for a particular flow versus operational state profile (e.g., pivot angle of a wastegate arm, etc.).

FIG. 9 also includes a diagram 995 that illustrates some examples of wall features. For example, a wall may include a minimum axial height and a maximum axial height. As an example, with respect to angle about an axis, a wall may vary in height linearly (see, e.g., a profile 996) or nonlinearly (see, e.g., profiles 997 and 998). While the profiles in the diagram 995 are shown for a single minimum and a single maximum over a span of 360 degrees, a wall may include minima (e.g., local, global), maxima (e.g., local, global) or minima and maxima (e.g., local, global) and, for example, a profile may be for a span of less than 360 degrees.

Figure 10:
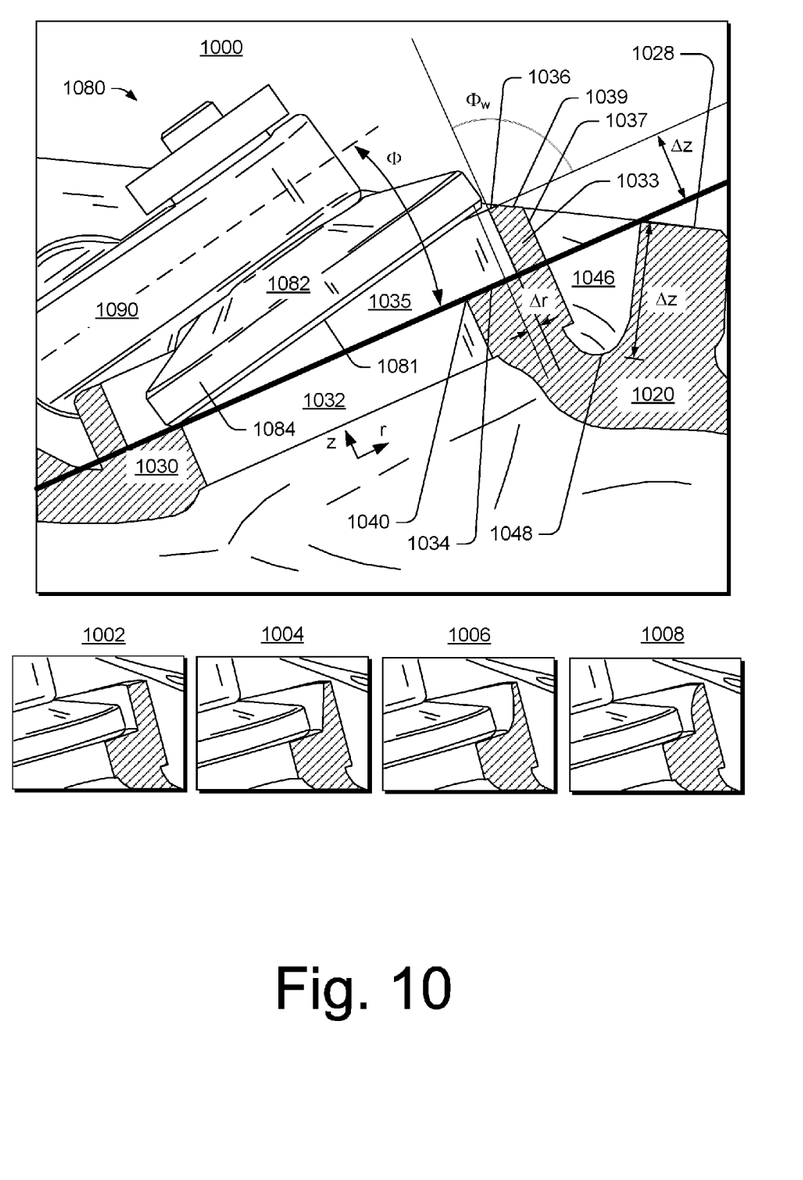
FIG. 10 is a cutaway view of an example of a wall associated with a wastegate opening and a series of cutaway views of examples of walls.

FIG. 10 shows an example of an assembly 1000 and some examples of cross-sectional wall profiles 1002, 1004, 1006 and 1008. As shown, the assembly 1000 includes a turbine housing component 1020 and a wastegate 1080 where a wastegate arm 1090 carries a plug portion 1082 that can be positioned with respect to a wastegate seat of a substantially flat surface 1034 that surrounds an opening 1040 formed by a substantially cylindrical wall portion 1030 of the turbine housing component 1020. For example, the wastegate arm 1090 may include a shaft disposed in a bore of the turbine housing component 1020 where pivoting of the shaft in the bore causes the wastegate arm 1090 to rotate an angle Φ with respect to a plane defined by the substantially flat surface 1034 (e.g., by a plane defined by the wastegate seat).

In the example of FIG. 10, the plug portion 1082 includes a lower surface 1081 for contacting the wastegate seat of the substantially flat surface 1034 as well as a rim surface 1084. As shown, a wall 1033 rises from the substantially flat surface 1034, for example, at an angle approximately perpendicular to a plane defined by the wastegate seat. The wall 1033 includes a surface 1035 that meets a surface 1036, which may be disposed parallel to the plane defined by the wastegate seat. As shown, the surface 1035 is disposed at a radial distance sufficient for forming a clearance between the rim surface 1084 of the plug portion 1082 upon pivoting of the wastegate arm 1090.

Also shown in the example of FIG. 10 is a surface 1039 of the wall 1033 which is disposed evenly with a substantially flat surface 1028 of the turbine housing component 1020. In such a manner, without the wastegate arm 1090 and the plug portion 1082, the turbine housing component 1020 may be set on a flat surface (e.g., the height of the surface 1039 does not interfere with contact between the surface 1028 and a flat surface (e.g., a work surface, assembly surface, machining surface, etc.)). As shown, the surface 1039 meets another surface 1037 at an edge where the surface 1037 descends axially to the substantially cylindrical wall portion 1030 of the turbine housing component 1020.

In the example of FIG. 10, the turbine housing component 1020 also includes a wall 1046 that descends from an edge of the surface 1028 to a floor 1048. As an example, the wall 1046 and the floor 1048 may form a chamber (see, e.g., the assembly 200 of FIG. 2, etc.). In the example of FIG. 10, the wall 1033 is contained within the chamber as the wall 1033 does not extend above the surface 1028.

As an example, an axial height of the wall 1033 (e.g., along the surface 1035) may be in a range from greater than 0 mm to greater than 1 mm. As an example, with respect to a wastegate seat, a wall may be disposed at an angle that provides for movement of a plug portion upon movement of a wastegate arm that carries the plug portion.

In the example profiles 1002, 1004, 1006 and 1008, a wall has a particular shape that acts to shape an opening or plug side surface of the wall. The profile 1002 shows a wall that rises perpendicular to a wastegate seat, the profile 1004 shows a wall that rises at an angle to a wastegate seat (e.g., a non-perpendicular angle), the profile 1006 shows a wall that has a nonlinear concave shape and the profile 1008 shows a wall that has a nonlinear convex shape.

As an example, a plug portion may be integral to a wastegate arm. As an example, a shaft may be integral to a wastegate arm, for example, for pivoting the wastegate arm via the shaft where the shaft is at least in part disposed in a bore (e.g., of a turbine housing component).

Figure 11:
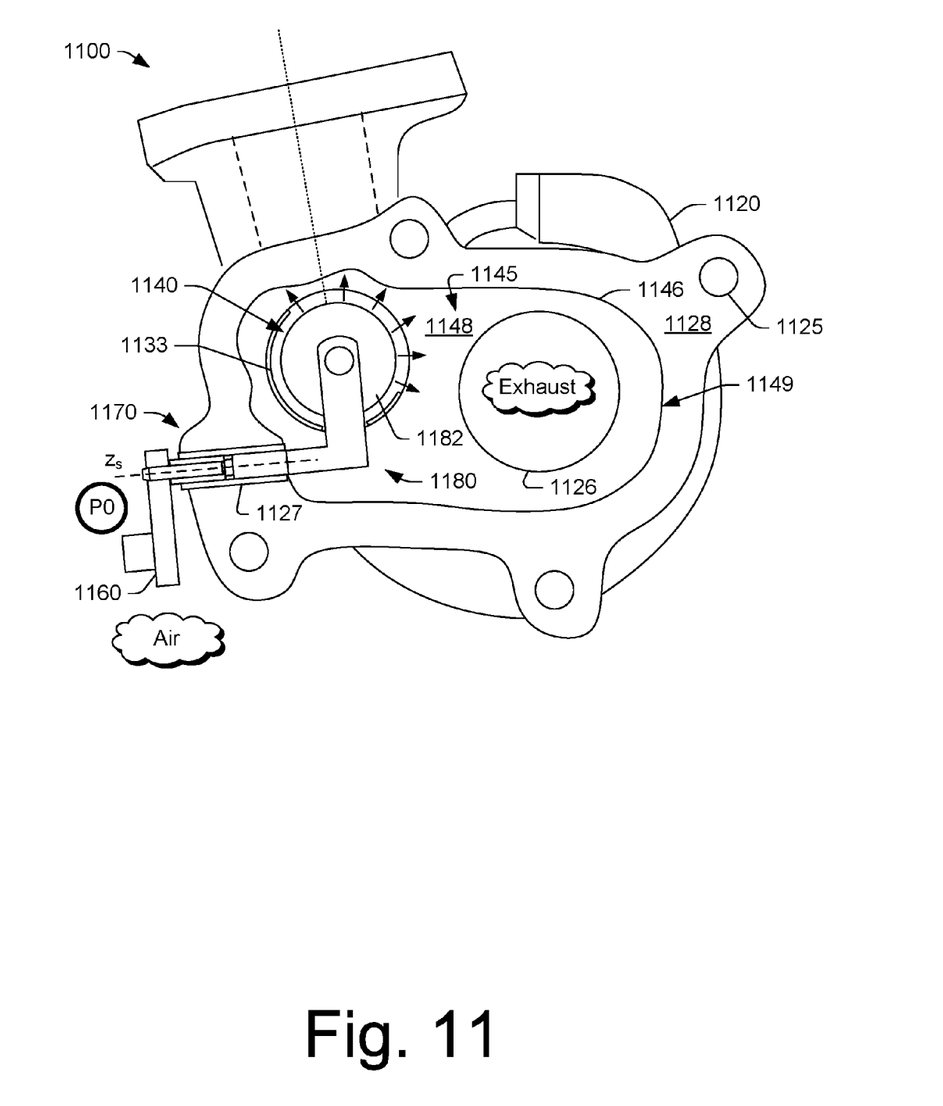
FIG. 11 is a plan view of an example of a turbine housing assembly that includes a wastegate and a wall.

FIG. 11 shows an example of an assembly 1100 that includes a turbine housing component 1020 with a space for a turbine wheel that has an opening 1126 in a floor 1148 of a chamber 1145 where an opening 1140 can be closed via a plug portion 1182 of a wastegate 1180 operated via a control shaft assembly 1070 fitted with a control mechanism 1160. As shown in the example of FIG. 11, a wall 1133 exists about a portion of the opening 1140 (e.g., rising from a wastegate seat).

In the example of FIG. 11, the wall 1133 may be configured to direct exhaust away from a bore 1127 in the turbine housing component 1120, which may, in turn, reduce leakage of exhaust from the chamber 1145 to an ambient environment. For example, a turbocharger may include the assembly 1100 where a conduit is bolted to a surface 1128 of the turbine housing component 1120 via one or more apertures 1125, optionally with a gasket disposed between a flange portion of the conduit and the surface 1128, to direct flow of exhaust via an opening 1149 of the chamber 1145 to the conduit. As the wastegate 1180 may be operated when exhaust pressure is high (e.g., to reduce flow from a turbine wheel space), exhaust passing through the opening 1140 may increase risk of exhaust leakage via one or more clearances between the bore 1127 and one or more components of the control shaft assembly 1170 (e.g., shaft, bushing, etc.). In the example of FIG. 11, the wall 1133 may direct exhaust over an angular span that faces away from the bore 1127 and thereby reduces risk of such exhaust leakage. Further, as described herein, the wall 1133 may be configured to enhance one or more other performance aspects of the turbocharger (e.g., boost control, surge control, etc.).

As an example, a turbocharger may include a variable geometry turbine system (e.g., VGT, VNT, etc.) and a controller may be provided to control both a wastegate and the variable geometry turbine system. In such an example, the controller may be programmed or otherwise configured (e.g., via dedicated circuitry, mechanics, etc.) to account for flow versus operational state of the wastegate, as dependent upon one or more characteristics of a wall disposed about a wastegate opening (e.g., that can act to reduce flow to a turbine wheel as at least partially disposed in a turbine housing of a turbocharger).

While various examples show walls for wastegates with single plug portion to cover a single opening, an example may include a wall for a wastegate with a plug portion or plug portions configured to cover multiple openings. While various examples show walls for wastegates with respective plug portions to cover relatively circular openings, an opening may have a non-circular shape (e.g., polygonal, elliptical, etc.), which is not shown in the drawings.

While various examples show walls for wastegates as being integral to a turbine housing component, as an example, a wall may be a component that can be attached to a turbine housing component. For example, a turbine housing component may include holes for receipt of pegs that extend from a wall where a wall may be selected for a particular application to achieve a particular flow versus operational state profile.

As an example, a turbine housing component and a wall may include a slot and ridge arrangement, optionally where the wall may be positioned at a particular angle or angular span about an axis of a wastegate opening (e.g., by locating and then press fitting a ridge of a wall in a circumferential slot, etc.). As an example, a ridge or a slot may allow for positioning one or more walls, for example, where an assembly process may include selecting positions to achieve one or more performance goals.

As an example, a kit may be provided with several walls where an assembly process includes selecting a wall from the several walls for installation with respect to a turbine housing component.

As an example, an assembly can include a wastegate that includes a wastegate arm and a plug portion positionable in a closed operational state and in open operational states; and a turbine housing component that includes wall and floor surfaces that define an exhaust chamber, a passage to the exhaust chamber defined by a surface of a wall, the passage extending along an axis to a wastegate opening, a wastegate seat disposed a radial distance about the wastegate opening to seat a surface of the plug portion in the closed operational state of the wastegate, and a wall extending axially away from the wastegate seat into the exhaust chamber to establish a relationship for exhaust flow from the passage via the wastegate opening to the exhaust chamber with respect to the open operational states of the wastegate. In such an example, the turbine housing component may include a bore for receipt of a shaft connected to the wastegate arm, the shaft rotatable in the bore to position the wastegate in the closed operational state an in the open operational states.

As an example, a wall extending axially away from a wastegate seat may be a segmented wall, for example, where each of the segments spans an angle about an axis and where gaps between adjacent segments define throats for flow of exhaust in one or more open operational states of a wastegate.

As an example, a wall extending axially away from a wastegate seat may be a wavy wall, for example, a wavy wall that has a sinusoidal or other profile.

As an example, a wall extending axially away from a wastegate seat may extend axially away from the wastegate seat at a non-orthogonal angle to a plane defined by the wastegate seat.

As an example, a wall extending axially away from a wastegate seat may include one or more passages, for example, consider one or more passages that have an axial height less than an axial height of the wall.

As an example, a wall may include an upper surface that increases in axial height from a minimum axial height to a maximum axial height with respect to azimuthal angle about the axis. As an example, a wall may have an angular span less than 360 degrees. As an example, a maximum axial height of a wall may correspond to a position on a plug portion of a wastegate that experiences the greatest axial displacement for open operational states of the wastegate.

As an example, a wall extending axially away from a wastegate seat may include a concave profile, a convex profile or concave and convex profiles.

As an example, a wall extending axially away from a wastegate seat may include an axial height at a position proximate to a bore of a wastegate control shaft that exceeds an axial height at a position displaced by more than 30 degrees from the position proximate to the bore.

As an example, a turbocharger may include a center housing assembly with a through bore; a compressor housing assembly operatively coupled to the center housing assembly; and a turbine housing assembly operatively coupled to the center housing assembly where the turbine housing assembly includes a wastegate with a wastegate arm and a plug portion positionable in a closed operational state and in open operational states; and a turbine housing component that includes wall and floor surfaces that define an exhaust chamber, a passage to the exhaust chamber defined by a surface of a wall, the passage extending along an axis to a wastegate opening, a wastegate seat disposed a radial distance about the wastegate opening to seat a surface of the plug portion in the closed operational state of the wastegate, and a wall extending axially away from the wastegate seat into the exhaust chamber to establish a relationship for exhaust flow from the passage via the wastegate opening to the exhaust chamber with respect to the open operational states of the wastegate. In such an example, the turbocharger may include a controller configured for positionable control of the wastegate in the closed operational state and in the open operational states. Such a controller may include control logic that operates at least in part on the established relationship for exhaust flow from the passage via the wastegate opening to the exhaust chamber with respect to the open operational states of the wastegate.

As an example, a wall extending axially away from a wastegate seat may be a wall integral to a turbine housing component or a wall fixable to a turbine housing component.

Conclusion

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
a wastegate that comprises a wastegate arm and a plug portion positionable in a closed operational state and in open operational states; and
a turbine housing component that includes:
an exhaust chamber that is defined by a chamber wall that defines an exhaust outlet opening and a chamber floor that comprises a wastegate opening,
a wastegate seat that is disposed about the wastegate opening to seat the plug portion in the closed operational state of the wastegate, and
a wall that forms a corner with the wastegate seat being disposed at an outbound radial distance from the wastegate opening and having an inbound, spaced relationship from the chamber wall and that extends away from the wastegate seat into the exhaust chamber, the wall that forms the corner with the wastegate seat at least partially surrounds the plug portion when the wastegate is in the closed operational state,
wherein the wall that forms the corner with the wastegate seat is integral to the turbine housing component and increases from a minimum height with respect to the wastegate seat to a first maximum height with respect to the wastegate seat, and at least one portion of the wall that forms the corner with the wastegate seat has a second maximum height with respect to the wastegate seat that is greater than the minimum height and less than the first maximum height, and wherein the wall that forms the corner with the wastegate seat comprises a surface that is disposed at an angle $\varphi$ that is greater than 90 degrees with respect to the wastegate seat.

2. The assembly of claim 1 wherein the turbine housing component comprises a bore for receipt of a shaft connected to the wastegate arm, the shaft rotatable in the bore to position the wastegate in the closed operational state an in the open operational states.

3. The assembly of claim 1 wherein the wall that forms the corner with the wastegate seat comprises an angular span less than 360 degrees about the wastegate opening.

4. The assembly of claim 1 wherein the surface that is disposed at an angle $\varphi$ that is greater than 90 degrees with respect to the wastegate seat extends to an upper surface of the wall that forms the corner with the wastegate seat.

5. The assembly of claim 4 wherein a distance between the wastegate seat and the upper surface defines the first maximum height and the second maximum height.

6. The assembly of claim 4 wherein the upper surface comprises a radial dimension Δr.

7. The assembly of claim 1 wherein the wall that forms the corner with the wastegate seat comprises a circular shape.

8. The assembly of claim 1 wherein the wall that forms the corner with the wastegate seat comprises a non-circular shape.

9. The assembly of claim 1 wherein the chamber wall extends to a flange portion that defines the exhaust outlet opening.

10. A turbocharge comprising:
a center housing assembly that comprises a through bore;
a compressor housing assembly operatively coupled to the center housing assembly; and
a turbine housing assembly operatively coupled to the center housing assembly wherein the turbine housing assembly comprises
a wastegate that comprises a wastegate arm and a plug portion positionable in a closed operational state and in open operational states; and
a turbine housing component that includes:
an exhaust chamber that is defined by a chamber wall that defines an exhaust outlet opening and a chamber floor that comprises a wastegate opening,
a wastegate seat that is disposed about the wastegate opening to seat the plug portion in the closed operational state of the wastegate, and
a wall that forms a corner with the wastegate seat being disposed at an outbound radial distance from the wastegate opening and having an inbound, spaced relationship from the chamber wall and that extends away from the wastegate seat into the exhaust chamber, the wall that forms the corner with the wastegate seat at least partially surrounds the plug portion when the wastegate is in the closed operational state,
wherein the wall that forms the corner with the wastegate seat is integral to the turbine housing component and increase from a minimum height with respect to the wastegate seat to a first maximum height with respect to the wastegate seat, and at least one portion of the wall that forms the corner with the wastegate seat has a second maximum height with respect to the wastegate seat that is greater than the minimum height and less than the first maximum height, and wherein the wall that forms the corner with the wastegate seat comprises a surface that is disposed at an angle φ that is greater than 90 degrees with respect to the wastegate seat.

11. The turbocharge of claim 10 comprising a controller-that positions the wastegate and the plug portion.

12. The turbocharge of claim 11 wherein the controller comprises control logic that operates at least in part on an established relationship for exhaust flow from a passage via the wastegate opening to the exhaust chamber with respect to the open operational states of the wastegate.

13. The turbocharge of claim 10 further comprising a variable geometry turbine system.

14. The turbocharge of claim 10 wherein the wall that forms the corner with the wastegate seat comprises an angular span the 360 degrees about the wastegate opening.

15. An assembly comprising:
a wastegate that comprises a wastegate arm and a plug portion positionable in a closed operational state and in open operational states; and
a turbine housing component that includes:
an exhaust chamber that is defined by a chamber wall that defines an exhaust outlet opening and a chamber floor that comprises a wastegate opening,
a wastegate seat that is disposed about the wastegate opening to seat the plug portion in the closed operational state of the wastegate, and
a wall that forms a corner with the wastegate seat being disposed at an outbound radial distance from the wastegate opening and having an inbound, spaced relationship from the chamber wall and that extends away from the wastegate seat into the exhaust chamber, the wall that forms the corner with the wastegate seat at least partially surrounds the plug portion when the wastegate is in the closed operational state,
wherein the wall that forms the corner with the wastegate seat from increases from a minimum height with respect to the wastegate seat to a first maximum height with respect to the wastegate seat, and at least one portion of the wall that forms the corner with the wastegate seat has a second maximum height with respect to the wastegate seat that is greater than the minimum height and less that the first maximum height,
wherein the wall that forms the corner with the wastegate seat comprises a surface that is disposed at an angle φ that is greater than 90 degrees with respect to the wastegate seat and extends to an upper surface of the wall that forms the corner with the wastegate seat, and
wherein a distance between the wastegate seat and the upper surface defines the first maximum height and the second maximum height.

* * * * *